United States Patent
Legot et al.

(10) Patent No.: US 10,351,012 B2
(45) Date of Patent: Jul. 16, 2019

(54) SUPPORT DEVICE FOR A TUBE, IN PARTICULAR A TUBE OF A HEAT EXCHANGER DESIGNED TO COME INTO CONTACT WITH A MOTOR VEHICLE BATTERY

(71) Applicant: Valeo Systemes Thermiques, Le Mesnil Saint Denis (FR)

(72) Inventors: Laurent Legot, Paris (FR); Fabien Bireaud, Le Mesnil Saint-Denis (FR)

(73) Assignee: Valeo Systemes Thermiques, Le Mesnil Saint Denis (FR)

(*) Notice: Subject to any disclaimer, the term of this patent is extended or adjusted under 35 U.S.C. 154(b) by 207 days.

(21) Appl. No.: 15/037,106

(22) PCT Filed: Oct. 23, 2014

(86) PCT No.: PCT/EP2014/072769
§ 371 (c)(1),
(2) Date: May 17, 2016

(87) PCT Pub. No.: WO2015/071068
PCT Pub. Date: May 21, 2015

(65) Prior Publication Data
US 2016/0297320 A1    Oct. 13, 2016

(30) Foreign Application Priority Data
Nov. 18, 2013  (FR) ..................................... 13 61267

(51) Int. Cl.
*B60K 1/04* (2019.01)
*H01M 10/623* (2014.01)
(Continued)

(52) U.S. Cl.
CPC ............ *B60L 11/1874* (2013.01); *B60K 1/04* (2013.01); *B60L 50/64* (2019.02); *B60L 58/26* (2019.02);
(Continued)

(58) Field of Classification Search
CPC ... B60L 11/1874; B60L 58/26; H01M 10/613; H01M 10/623; H01M 10/625; H01M 10/655; F28F 2275/08
See application file for complete search history.

(56) References Cited

U.S. PATENT DOCUMENTS

2017/0125867 A1* 5/2017 Beaurepaire ........ H01M 2/1072

FOREIGN PATENT DOCUMENTS

| DE | 10 2010 032898 A1 | 2/2012 |
| DE | 10 2010 038681 A1 | 2/2012 |

(Continued)

OTHER PUBLICATIONS

EP 2388851 A1 translation.*
(Continued)

*Primary Examiner* — Jon T. Schermerhorn, Jr.
(74) *Attorney, Agent, or Firm* — Osha Liang LLP

(57) ABSTRACT

The invention concerns a support device (1) for a tube, in particular a tube of a heat exchanger designed to come into contact with a vehicle battery for cooling thereof, the device (1) comprising a base (13) on which the tube is designed to be mounted, an element (15) for compressing the tube against the battery, and one or more elements (17) for connecting the compression element (15) to the base (13), the connecting elements (17) being configured to engage with a face (19) of the compression element (15) opposite said base (13) while being in contact with the base (13) on either side of said compression element (15).

17 Claims, 2 Drawing Sheets

Figure 7:
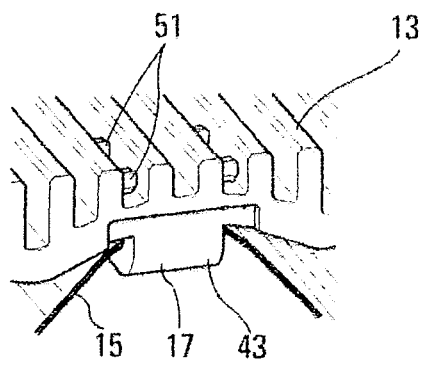

(51) Int. Cl.
    *H01M 10/655*     (2014.01)
    *B60L 11/18*     (2006.01)
    *F28F 9/013*     (2006.01)
    *H01M 10/6554*     (2014.01)
    *H01M 10/613*     (2014.01)
    *F28F 1/02*     (2006.01)
    *H01M 10/625*     (2014.01)
    *F28F 13/00*     (2006.01)
    *B60L 58/26*     (2019.01)
    *B60L 50/64*     (2019.01)
    *B60K 1/00*     (2006.01)
    *F28D 1/06*     (2006.01)

(52) U.S. Cl.
    CPC .............. *F28F 1/02* (2013.01); *F28F 1/022* (2013.01); *F28F 9/0131* (2013.01); *F28F 13/00* (2013.01); *H01M 10/613* (2015.04); *H01M 10/623* (2015.04); *H01M 10/625* (2015.04); *H01M 10/655* (2015.04); *H01M 10/6554* (2015.04); *B60K 2001/005* (2013.01); *F28D 1/06* (2013.01); *F28F 2270/00* (2013.01); *F28F 2275/08* (2013.01); *Y02T 10/705* (2013.01); *Y02T 10/7005* (2013.01)

(56) References Cited

FOREIGN PATENT DOCUMENTS

| | | | | |
|---|---|---|---|---|
| DE | 102010032898 A1 | * | 2/2012 | .......... H01M 2/1083 |
| DE | 20 2012 102969 U1 | | 9/2012 | |
| EP | 2 388 851 A1 | | 11/2011 | |
| EP | 2388851 A1 | * | 11/2011 | .......... F28D 1/05383 |
| FR | 3020722 A1 | * | 11/2015 | .......... H01M 2/1072 |
| WO | WO-2015166092 A1 | * | 11/2015 | ................ B60K 1/04 |

OTHER PUBLICATIONS

International Search Report issued in PCT/EP2014/072769 dated Feb. 12, 2015 (3 pages).
Written Opinion of the International Searching Authority issued in PCT/EP2014/072769 dated Feb. 12, 2015 (8 pages).

\* cited by examiner

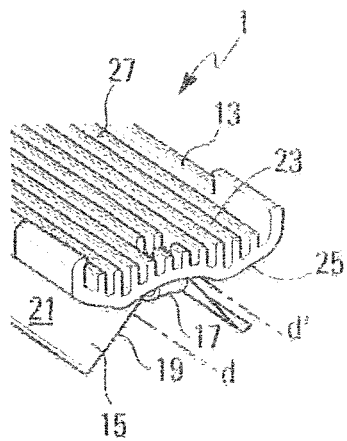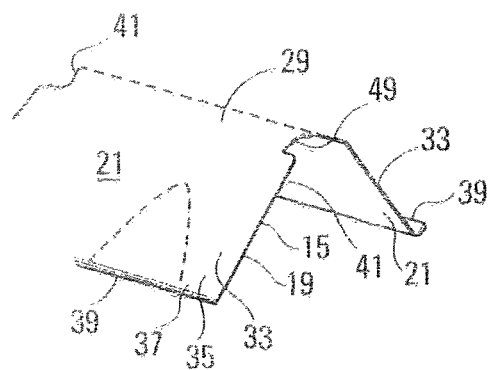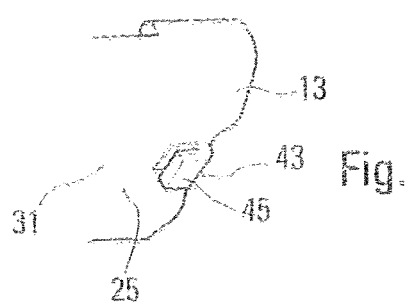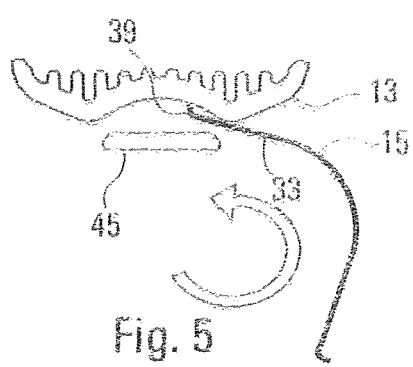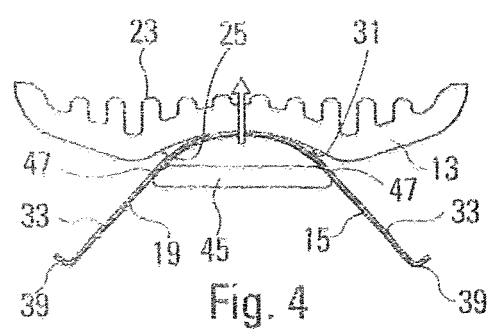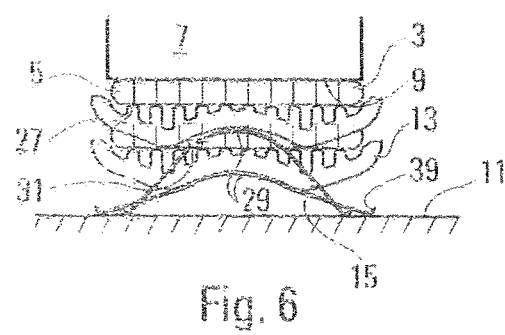

SUPPORT DEVICE FOR A TUBE, IN PARTICULAR A TUBE OF A HEAT EXCHANGER DESIGNED TO COME INTO CONTACT WITH A MOTOR VEHICLE BATTERY

The present invention concerns a support device for a tube, in particular a tube of a heat exchanger designed to come into contact with a motor vehicle battery, in particular for cooling of said battery.

To ensure good contact between the battery and the heat exchanger despite the different mounting tolerances which can occur, one possibility is to use a compression spring.

More precisely, a tube support may be used comprising a base on which the tube is mounted, together with a compression element which is configured to press the tube against the battery, the compression element comprising a spring substantially formed as a leaf and fixed to the base by means of clips engaged in holes in a central part of the leaf. Nonetheless, the holes in the compression element increase its fragility and harm the reliability of the support.

The invention proposes to remedy this drawback in full or in part.

To this end, a support device is proposed for a tube, in particular a tube of a heat exchanger designed to come into contact with a vehicle battery for cooling thereof, the device comprising a base on which the tube is designed to be mounted, an element for compressing the tube against the battery, and one or more elements for connecting the compression element to the base, the connecting elements being configured to engage with a face of the compression element opposite said base while being in contact with the base on either side of said compression element.

Thus, the fixing elements do not require any drilling holes in the body of the compression element and avoid increasing its fragility.

Said base advantageously comprises a first face shaped to support the tube in a thermally insulated fashion, and a second face on which the compression element is intended to rest when under pressure.

Said first and second, faces are advantageously opposite each other such that the force applied by the compression element to the first face is transmitted directly to the tube by the second face.

According to other characteristics of the invention which may be taken together or separately:
  said base is provided with ribs on its first face, said ribs being designed to be applied to the tube by the end, thus reinforcing a thermally insulated holding of the tube,
  the compression element is mounted flexibly on the base,
  the compression element is advantageously a spring in the form of a strip with rounded apex, or substantially in the form of an inverted trough,
  said rounded apex of the spring is received in a concave zone or a recess of said second face,
  said recess is shaped to correspond to a maximum extension of the spring,
  said recess is shaped to define, laterally in cross section, two linear support zones against which the spring comes to rest at least in its nominal extension,
  said spring strip is designed to be mounted flexibly on a support surface,
  said spring strip comprises two opposing folds or legs, in particular symmetrical relative to a median longitudinal plane of the strip, said folds being configured to be movable on the support surface,
  said two opposite folds comprise flexible lugs designed to be applied to the support surface,
  said spring strip has a thickness equal to approximately 0.1 to 0.3 mm, preferably a thickness between 0.15 and 0.2 mm,
  said connecting elements are configured to engage on either side of longitudinal opposing edges of the compression element, in particular on either side of longitudinal opposing edges of said strip, in particular at the level of said rounded apex,
  said connecting elements comprise one or more hook-shaped engagement elements, preferably two hook-shaped engagement elements, holding said compression element on either side of the base, for example at the level of said longitudinal opposing edges of the spring strip, in particular at the level of the rounded apex of the spring strip,
  said two hook-shaped engagement elements are preferably identical to each other and opposite each other relative to a median transverse plane of the strip,
  said two hook-shaped engagement elements comprise a branch arranged at a distance from the apex of the spring to allow an elastic deflection of the spring,
  said two hook-shaped engagement elements are arranged on the base to allow the spring to be fitted or removed by rotation by an end of one of the edges, in particular of one of the spring folds, engaged between the base and each of the hook-shaped engagement elements,
  said connecting elements and said compression element are configured respectively so that, on mounting of the compression element, the latter, in particular said strip, is compressed on the connecting elements so as to fasten, in particular by gripping, the compression element to the base; this reinforces the holding of the compression element on the base by utilizing its elasticity,
  the connecting element or elements, in particular said hook-shaped engagement element or elements, are formed integrally with the base, preferably from molding of material, in particular of plastic material,
  said connecting element or elements, in particular said hook-shaped engagement element or elements, are mounted attached to the base,
  the spring and the base are arranged facing each other over a substantially equivalent length, the spring being in particular cut out at its ends,
  said connecting element or elements comprise an elastic strap able to be stretched below the compression element.

The invention also concerns the assembly of a heat exchanger, comprising tubes, and of a plurality of support devices, as described above, supporting said tubes.

The invention also concerns a battery comprising such an assembly. In said battery, the tubes are in particular applied against a bottom face of the battery for cooling thereof.

Further characteristics and advantages of the invention will appear from reading the description which follows of exemplary embodiments, given merely illustratively, with reference to the attached drawings on which:

FIG. 1 is a partial perspective view of a tube support device according to one embodiment of the invention, FIG. 2 is a perspective view from below of an end part of the base of the device in FIG. 1, FIG. 3 is a perspective view from above of an end part of the compression element of the device in FIG. 1, FIG. 4 is a diagrammatic cross-section view of the device in FIG. 1, FIG. 5 is a view similar to FIG. 4, showing the fitting or removal of the compression element of the device in FIG. 1, FIG. 6 is a view similar to FIG. 4, showing the rest and compression positions of the compression element of the device in FIG. 1, and FIGS. 7 to 10 illustrate in perspective views variant embodiments of the invention.

The same reference numerals are used to designate identical or similar elements.

The invention concerns, as illustrated, a support device 1 for a tube 3 of a heat exchanger 5 for the cooling of a vehicle battery 7.

The device 1 is arranged in particular below the battery 7, see FIG. 6, and is intended to press the tube 3 of the heat exchanger against the bottom face 9 of the battery. Said device 1 is itself supported in vertical projection by a support element or surface 11 of the vehicle, for example the base of a housing compartment for the battery or batteries.

As a variant, the device could place the tube in contact with another face of the battery (not shown), for example on a side face or a top face of the battery.

The device comprises a base 13 on which the tube 3 is intended to be mounted, and a compression element 15 mounted on the base and designed to press the tube against the battery.

The device furthermore comprises elements 17 for connecting the compression element 15 to the base 13.

According to the invention, the connecting elements 17 are configured to engage with a face 19 of the compression element opposite said base, in other words the lower face of the compression element. Said connecting elements are also in contact with the base 13 on either side of said compression element 15.

The compression element 15 comprises in particular a body 21, here in the form of a longitudinal strip of axis d substantially parallel to a longitudinal extension axis d' of the base. Said body 21 is connected to the base 13 by means of said connecting elements 17. The connecting elements 17 may for example be configured to engage by gripping on the body 21.

Thus, the compression element 15 is held against the base 13 without drilling holes, and consequently no stress zone is created, in particular around said holes, in said body, which would increase the fragility of the compression element.

Said base 13, as is shown particularly clearly on FIG. 4, comprises a first face 23 shaped to support the tube 3 in a thermally insulated fashion, and a second face 25 on which the compression element 15 is designed to be applied when under pressure.

Said first and second faces 23, 25 are advantageously opposite each other, such that the force applied by the compression element 15 on the second face 25, following the arrow in FIG. 4, is transmitted directly to the tube 3 by the first face 23.

Also, it is possible to deflect the force in an inclined direction oriented differently from that of the example.

Said base 13 is provided with ribs 27 on its first face 23 which are designed to be applied on the tube 3 by their end, which reinforces a thermally insulated holding of the tube by the base. This thermal insulation also results from the material of the base which is advantageously thermally insulating, for example of insulating plastic material.

The compression element 15 is mounted flexibly on the base 13, namely it can spread against the base 13, in particular in width (see FIG. 6), to press the tube 3 against the battery 7.

The compression element 15 also rests flexibly on the support element 11, namely it can spread or slide on the support element 11 to press the tube 3 into contact with the battery 7.

The compression element 15 is advantageously a spring in the form of a strip 21, as stated, with a rounded apex 29, or substantially in the form of an inverted trough. Such a spring 15 has a flexion capacity of the strip 21 in a cross section of the strip, over the entire length of the strip, which is preferably constant over this length.

Said rounded apex 29 of the spring is advantageously received in a concave zone or a recess 31 of said second face, which helps hold the spring 15 in position on the second face 25.

Said recess 31 is shaped to correspond to a maximum extension of the spring, visible at the bottom of FIG. 6. Thus, this recess 31 does not hinder the extension of the spring 15.

In particular, said recess 31 is rounded with a radius corresponding to the maximum extension of the spring 15, wherein the strip 21 is tangential to the longitudinal edges of the recess 31, and wherein the spring 15 presses the tube 3 against the battery 7 with maximum force.

Said spring strip 21 is in particular designed to be mounted flexibly on the support surface or support element 11, which may be flat as illustrated in FIG. 6.

Said spring strip 21 comprises two opposing folds 33 or legs which are configured to be movable on the support surface 11.

Said two opposing folds 33 may in particular comprise flexible lugs 35 intended to be pressed onto the support surface 11, as shown in dotted lines on FIG. 3. This characteristic increases the flexibility of the spring 15 on the support surface 11.

These lugs 35 may comprise a tapered end 37 which further increases the flexibility of the spring 15.

The ends 39 of the legs are advantageously curved upwards longitudinally and rounded to facilitate their movement on the support surface 11. Depending on the inherent flexion in the spring 15, the ends 39 of the legs 33 may in particular move further apart or draw closer together on the support surface 11, as shown on FIG. 6.

Said spring strip 21, in particular of metal material, has a thickness equal to approximately 0.1 to 0.3 mm. Preferably, such a strip 21 has a thickness between 0.15 and 0.2 mm. This slight thickness gives the strip its flexible nature.

Said connecting elements 17 are configured to engage on either side of opposite edges 41 of said strip 21, in particular at the level of said rounded apex 29. The connections are therefore substantially lateral, without requiring drilling as in the prior art.

Said spring strip 21 may stretch over a width of around 15 mm at rest to around 25 mm in extension, substantially the same width as that of the base 13.

Said connecting elements 17 here comprise one or more hook-shaped engagement elements 43, as can be seen particularly clearly on FIGS. 1 and 2, preferably two hook-shaped engagement elements 43 holding said compression element 15 on either side thereof. These hook-shaped elements 43 are in particular arranged at the opposite ends 41 of the strip, preferably at the level of the rounded apex 29 of the strip.

Said two hook-shaped engagement elements 43 are preferably identical to each other. However, the engagement elements may be of different designs, both in length and in cross section for example. They comprise a hook branch 45, in particular arranged at a distance from the apex 29 of the spring and from the support surface 11, to allow an elastic deflection of the spring and the molding of said branch.

Said hooks are in particular arranged on the base 13 to allow the fitting or removal of the spring 15 by rotation by an end 39 of a fold 33 of the spring engaged between the base 13 and each of the hook-shaped engagement elements 43, in particular their hook branch 45.

Advantageously, the spring 15 is slightly compressed on the hook-shaped engagement elements 43 so as to fasten, in particular by gripping, the spring 15 to the base 13. This gripping is achieved in particular by said strip 21 engaging on the opposing lateral edges 47 of the hook branch 45.

The spring 15 and the base 13 are in particular arranged facing each other over a same length, that of the length extension of the device, the spring 15 being able to be provided in particular with a cutout at its ends 49 for this purpose, see FIG. 3.

Said hook-shaped engagement element or elements 43 are advantageously formed integrally with the base 13, as illustrated on FIGS. 1 and 2, preferably from molding of material, in particular of plastic material.

Figure 8:
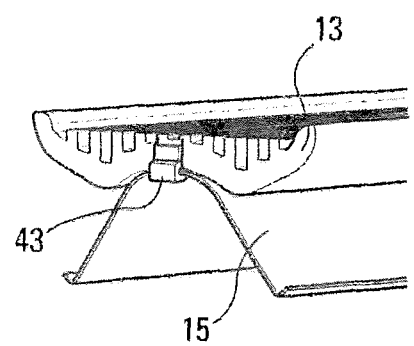

Said hook-shaped engagement element or elements 43 may alternatively be mounted attached to the base 13, for example be fixed to the base by means of clip-type hooks 51, arranged protruding from the hook-shaped engagement elements 43 and engaged in the base 13, in particular mounted passing through the base 13 as illustrated on FIGS. 7 and 8.

Figure 9:
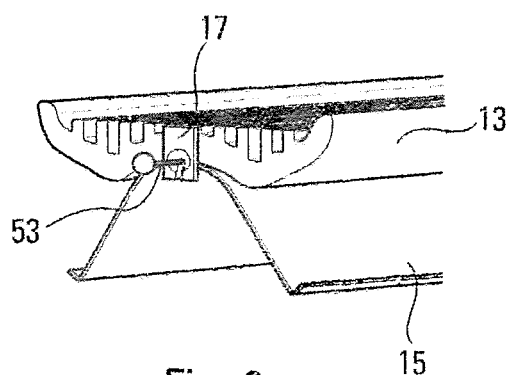
Figure 10:
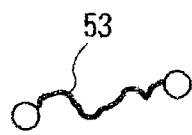

As a variant, said connecting elements 17 may comprise an elastic strap 53, see FIG. 10, able to be stretched below the spring 15 and be attached to the ends of the hook branches 45 or to a lug attached to the base as shown in FIG. 9.

The invention also concerns the assembly of an exchanger 5 and of a plurality of support devices 1, as described above, supporting the tubes 3 of the exchanger. Said exchanger is advantageously configured to be arranged against the battery 7, in particular to be applied against a face of the battery for the cooling thereof.

The method of mounting the device is very simple. It consists in particular of mounting said compression element 15 on the base 13, in particular by engaging said strip 21 by rotation between the base 13 and the hook-shaped engagement elements 43. The compression element is gripped on the branch 45 which allows handling of the device with the aim of installing it.

The mounting of the device for pressing the tubes 3 of the heat exchanger 5 against a face 9 of the battery consists of arranging the tubes 3 of the exchanger on said first face 23 of the base of their respective support device, and applying the compression element 15 under tension on said support element 11, for example under the effect of the weight of the battery.

The invention thus provides a simple and reliable solution for pressing a tube, in particular a tube of a vehicle heat exchanger, into thermal contact with a heat exchange surface.

The invention claimed is:

1. A support device for a tube of a heat exchanger that comes into contact with a vehicle battery for cooling thereof, the support device comprising:
   a base on which the tube is configured to be mounted;
   a compression element, in physical contact with an entirety of a length of a bottom face of the base, that compresses the tube against the battery;
   one or more connecting elements that connect the compression element to the base, the connecting elements being configured to engage with a face of the compression element opposite said base while being in contact with the base on either side of said compression element, and
   wherein a portion of the compression element is removed to allow clearance of the one or more connecting elements.

2. The device as claimed in claim 1, wherein said base comprises a first face is provided with ribs to support the tube in a thermally insulated fashion, and a second face on which the compression element rests when under pressure.

3. The device as claimed in claim 2, wherein the first and second faces of the base are opposite each other such that the force applied by the compression element to the first face is transmitted directly to the tube by the second face.

4. The device as claimed in claim 2, wherein the compression element is a spring in the form of a strip with rounded apex, or in the form of an inverted trough, said rounded apex of the spring being received in a concave zone or a recess of the second face of the base.

5. The device as claimed in claim 4, wherein said spring strip is designed to be mounted flexibly on a support surface inside the vehicle.

6. The device as claimed in claim 4, wherein said spring strip has a thickness value between 0.1 and 0.3 mm.

7. The device as claimed in claim 1, wherein said connecting element or elements are configured to engage on either side of longitudinal opposing edges of the compression element.

8. The device as claimed in claim 7, wherein said connecting element or elements comprise two hook-shaped engagement elements holding said compression element on either side of the base.

9. The device as claimed in claim 8, wherein said two hook-shaped engagement elements comprise a branch arranged at a distance from the apex of the spring to allow an elastic deflection of the spring.

10. The device as claimed in claim 8, wherein said two hook-shaped engagement elements are arranged on the base to allow the spring to be fitted or removed by rotation by spring edges engaged between the base and each of the hook-shaped engagement elements.

11. The device as claimed in claim 1, wherein said one or more connecting elements and said compression element are configured respectively so that, on mounting of the compression element, the latter is compressed on the connecting element or elements so as to fasten, by gripping, the compression element to the base.

12. The device as claimed in claim 1, wherein said one or more connecting elements are formed integrally with the base.

13. The device as claimed in claim 1, wherein said one or more connecting elements are mounted attached to the base.

14. The device as claimed in claim 1, wherein said one or more connecting elements comprise an elastic strap able to be stretched below the compression element.

15. An assembly of a heat exchanger, comprising:
   tubes; and
   a plurality of support devices, as claimed in claim 1, for supporting said tubes.

16. A battery comprising an assembly as claimed in claim 15.

17. A support device for a tube of a heat exchanger designed to come into contact with a vehicle battery for cooling thereof, the device comprising:
   a base on which the tube is to be mounted;
   a compression element that compresses the tube against the battery;

one or more connecting elements that connects the compression element to the base, the connecting elements being configured to engage with a face of the compression element opposite said base while being in contact with the base on either side of said compression element, and wherein the base and the compression element have a complimentary curvature located at a rounded apex of the compression element to allow contact between the base and the compression element.

\* \* \* \* \*